United States Patent [19]

McAvena

[11] Patent Number: 5,095,612
[45] Date of Patent: Mar. 17, 1992

[54] METHOD OF WATERPROOFING ELECTRIC MOTOR

[75] Inventor: Richard McAvena, Calgary, Canada

[73] Assignee: Continental Electric Motor Services Ltd., Calgary, Canada

[21] Appl. No.: 349,286

[22] Filed: May 9, 1989

[30] Foreign Application Priority Data

Jan. 20, 1989 [CA] Canada .................................. 588730

[51] Int. Cl.⁵ ............................................. H02K 15/14
[52] U.S. Cl. .................................... 29/596; 264/272.2; 310/88
[58] Field of Search ...................... 310/88, 89; 29/596; 264/272.19, 272.2

[56] References Cited

U.S. PATENT DOCUMENTS

| | | | |
|---|---|---|---|
| 3,512,024 | 5/1970 | Papa | 310/88 |
| 4,049,986 | 9/1977 | Kreuz | 310/88 |
| 4,451,750 | 5/1984 | Heuer et al. | 310/88 |
| 4,499,390 | 2/1985 | Iwaki et al. | 310/88 |

OTHER PUBLICATIONS

Leeson Brochure, "One Tough Duck".
Baldor Brochure, "Wash Down Duty Motors".

Primary Examiner—P. W. Echols

[57] ABSTRACT

A method involving modifications to a conventional electrical motor for the purpose of increasing its resistance to being damaged by the use of water or other liquids in its environment. The motor is disassembled, and all exposed areas of the stator windings are coated with an epoxy which forms a pliable coating when cured. The slots between the lamination bars of the stator also receive an epoxy coating. A layer of epoxy is formed within the junction box against the motor casing, and the epoxy layer has a portion extending into the lead wire opening of the casing and completely surrounds the lead wires passing outwardly through the opening. The normal bearings for the shaft are replaced with a sealed type bearing, and the endbells of the motor are machined to receive a seal outwardly of the bearings, which seal engages the shaft. The rotor is sprayed with material which forms a tough resilient film thereover. Bore holes of a small diameter are made adjacent the peripheral edges of the endbells to provide a passage from the lowermost portion of the enclosure formed by the casing when the motor is in its finally installed position.

12 Claims, 2 Drawing Sheets

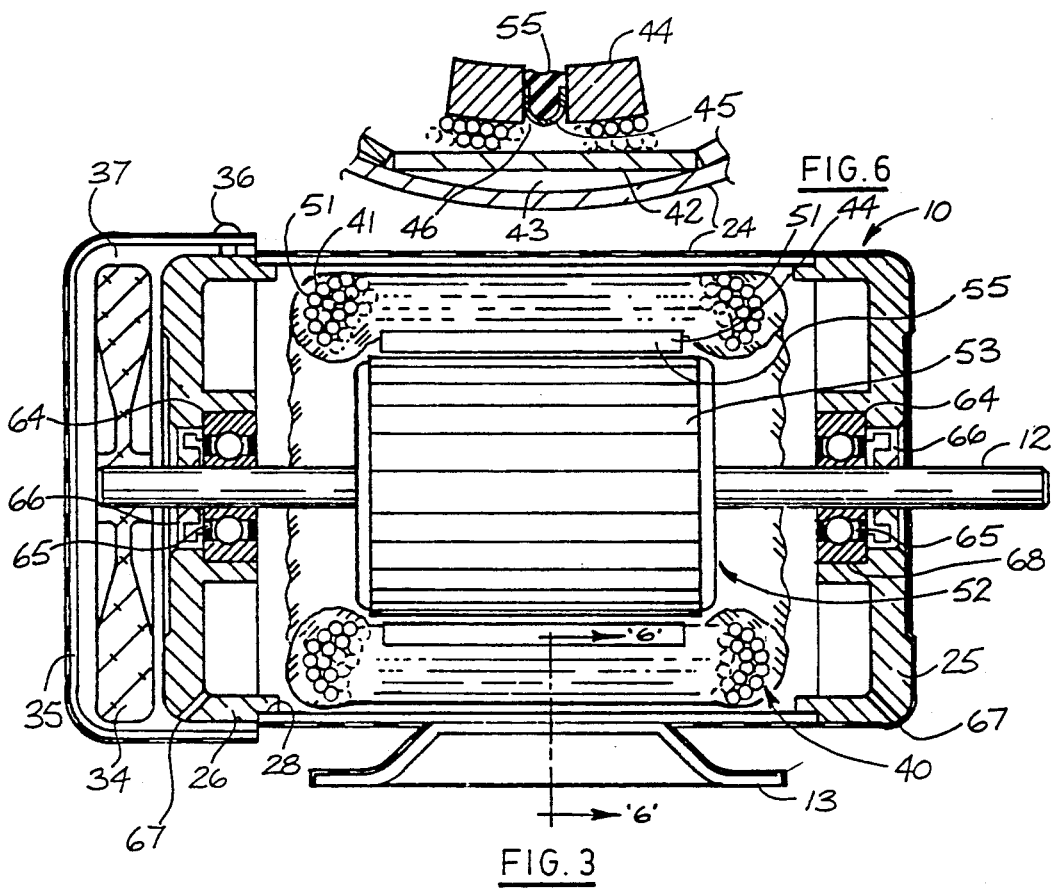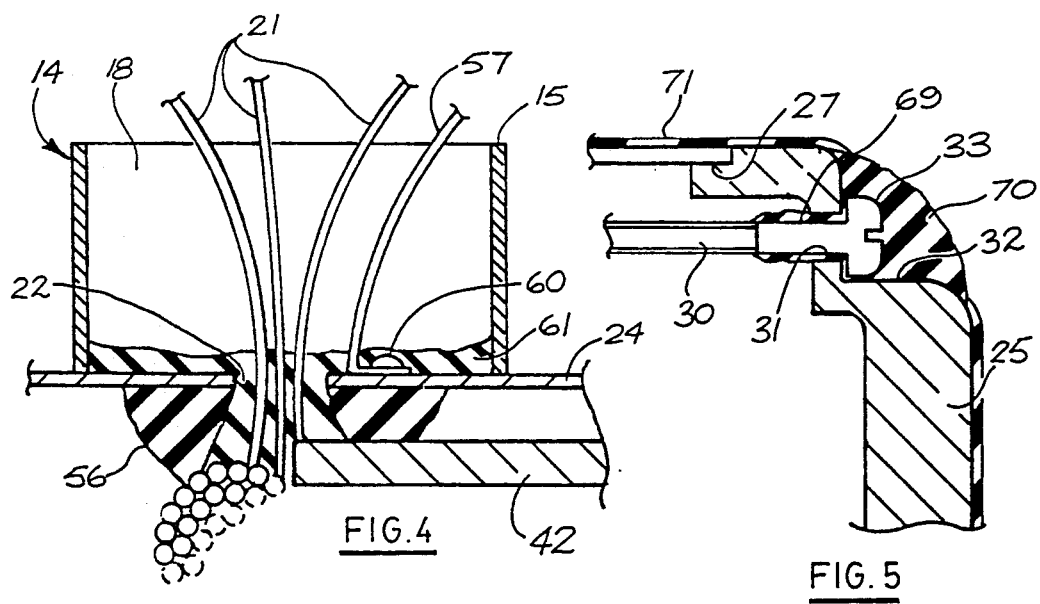

METHOD OF WATERPROOFING ELECTRIC MOTOR

BACKGROUND OF THE INVENTION

1. Field of the Invention

The present invention relates to a method of waterproofing a conventional electric motor, and also to the product produced by such a method.

2. Description of the Prior Art

Conventional motors, as produced for use by industry and consumers, are generally not resistant to the infiltration of moisture or liquids to internal critical areas. For a majority of usages of electric motors, this feature does not present a problem. However, in some installations, the effective life of a conventional motor can be drastically reduced because of water or other fluid contaminants entering the motor and resulting either in mechanical or electrical failure. In food processing plants, for example, where water is used in the processing or where the machines must be frequently washed, such as by high pressure streams, the motors in the machines or in the surrounding environments, are known to fail within a matter of only weeks. The costs of the motor and the labour involved in replacing it can be significant, but in industry, and particularly one which has continuous processes in operation, the down time experienced for the repair may become an even more important factor of the failure than such costs.

There have been produced various forms of modified conventional motors which include some waterproofing characteristics so as to provide lengthened lives for the motors when used in unfavourable environments, particularly in industry. Today, such modified motors have not proven to be fully satisfactory in that, even though the infiltration of liquids is greatly reduced, only very small amounts of moisture or other contaminants, if they reach critical locations within the motor, can result in a relatively short life for the motor.

SUMMARY OF THE INVENTION

It is an object of the present invention to provide a method of waterproofing a conventional type electric motor so as to enable the motor to enjoy an extended life when operated in adverse conditions, such as repeated waterspraying experienced in food processing plants.

According to one aspect of the present invention, there is provided a method of waterproofing a conventional electric motor of the type having an outer casing, stator windings mounted interiorly of the casing, a junction box mounted on an external surface of said casing, and lead wires internally connected to the stator windings and extending through an opening in the outer casing into the junction box. The method includes the steps of disassembling the motor so as to provide access to the stator windings and applying to all exposed areas of the stator windings, a covering of a liquid epoxy of a type capable of curing to a pliable coating. The method further includes the steps of applying a moldable plastic material through the opening in the casing and around the lead wires so as to form a barrier between the opening and the interior of the casing. A layer of liquid epoxy is then formed in the junction box to completely cover the opening and surround the lead wires extending through the openings. The epoxy covering and layer are allowed to cure prior to reassembling the motor.

According to another aspect of the present invention, there is provided a waterproofed electric motor of the type having an outer enclosure formed by a central cylindrical member clamped between a pair of endbells by a plurality of through bolts drawing the end bells toward each other, stator windings affixed within the cylindrical member and having longitudinally extending side by side lamination bars defining a central cylindrical volume, the windings having exposed end turn portions beyond the lamination bars, an axially disposed shaft mount and bearings in the endbells and having opposite ends projecting through bores in the endbells, and a cylindrical shaped rotor fixed to the shaft and located within the central cylindrical volume, and a junction box is affixed to the exterior surface of the enclosure, and lead wires extend from the stator windings through the opening in the enclosure and into the junction box. A cured coating of pliable epoxy is provided on all exposed surfaces of the stator windings. The bearings are of the sealed type having side seals affixed to an outer rim of the bearing and being in sliding contact with an inner rim thereof. Small drain holes are provided near the outer peripheral edges of the endbells so as to communicate with a lowermost portion of the interior of the enclosure when the motor is in its finally installed position. The holes are drilled to extend from the inside out at an angle extending downwardly relative to the horizontal when in the installed position. A pliable layer of cured epoxy is molded to the exterior surface of the enclosure in the junction box and is intricately formed with a portion of the epoxy which extends into the opening and surrounds the lead wires. A coating of epoxy paint is provided over the entire outside surface of the assembled motor.

In a specific embodiment, the epoxy coating on the stator windings covers the end turn portions of the stator windings and the epoxy is located between the lamination bars.

BRIEF DESCRIPTION OF THE DRAWINGS

In the accompanying drawings which illustrate the present invention, by example:

FIG. 3 is a cross-sectional view of the motor of FIGS. 1 and 2 as seen from the cross-sectional line 3—3 of FIG. 2;

FIG. 4 is a cross-sectional view through a junction box and a portion of the motor immediately adjacent thereto as seen from the cross-sectional line 4—4 of FIG. 1;

FIG. 5 is a cross-sectional view, on a slightly enlarged scale, through a portion of a bolt connection as seen from line 5—5 of FIG. 2; and FIG. 6 is a cross-sectional view through a portion of the stator and outer casing of the motor as seen from the line 6—6 of FIG. 3.

DESCRIPTION OF PREFERRED EMBODIMENT

Figure 1:
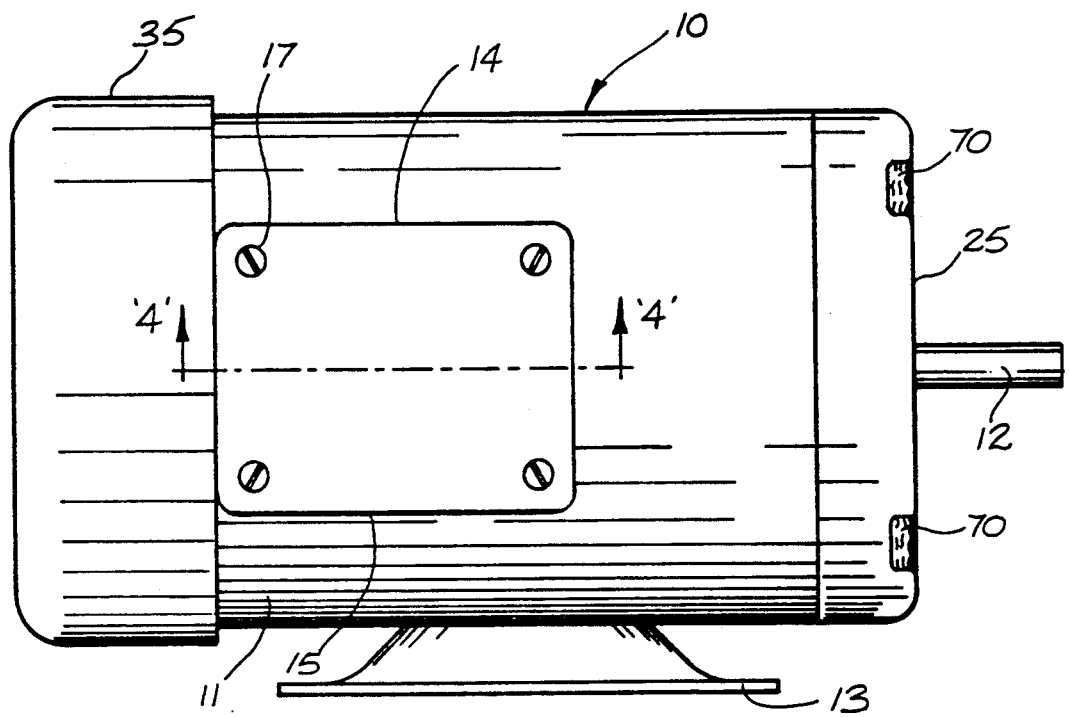
FIG. 1 is a side view of a completely assembled motor after the waterproofing method of the present invention has been carried out.
Figure 2:
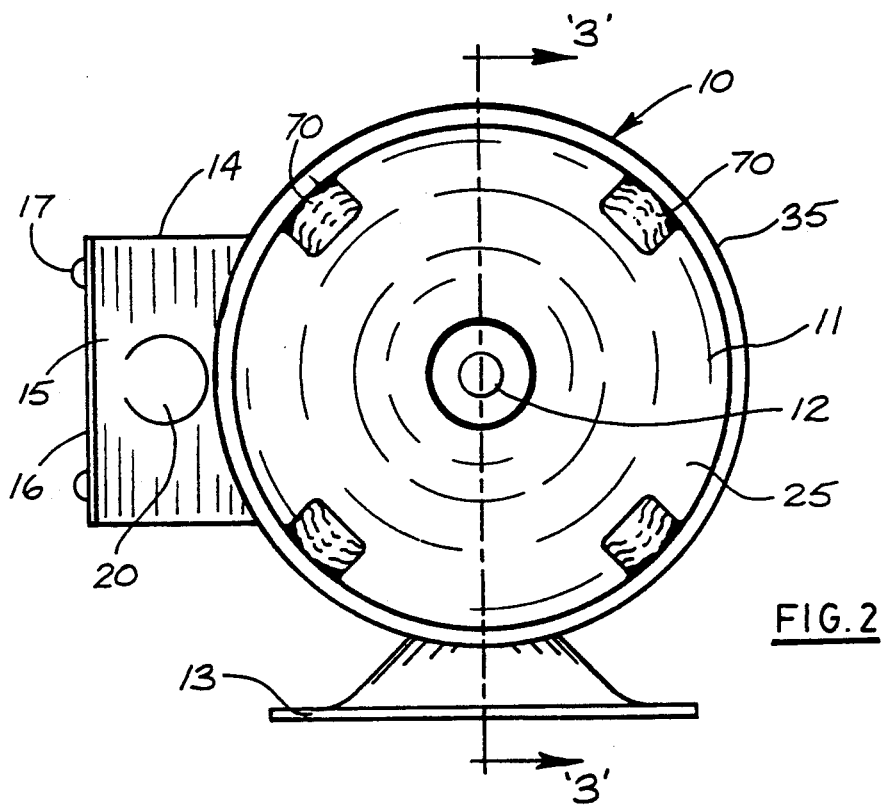
FIG. 2 is an end view of the motor of FIG. 1.

In FIGS. 1 to 3, the reference character 10 generally denotes a motor of a conventional design. The motor 10 has an outer casing or main body portion 11 from one end of which extends the output shaft 12 providing a drive, for example, through a drive pulley (not shown).

A mounting member 13 is attached to the main body 11, and the motor, as originally manufactured, may include features which permit the motor to be mounted either horizontally or vertically.

The motor 10 is provided with a junction box 14 which is shown in the embodiment of the drawings as being mounted on the side of the main body portion 11. The junction box 14, which provides an enclosure 18 is formed by four side walls 15 which may be affixed to the main body portion 11 by tack welding (not shown). The junction box is closed by a cover 16 held in place by screws 17 as shown in FIGS. 1 and 2. The side walls 15 of the junction box may be provided with one or more knock-out plugs 20. Lead wires 21, which are permanently connected to the stator windings within the motor, extend outwardly through an opening 22 in the main body portion. The lead wires are contained within the enclosure 18 when the motor is initially produced, and during installation of the motor, the knockout plug 20 is removed so as to receive an electrical supply wire which is attached to the ends of the lead wires 21 of the motor. After the connections are made, the cover 16 is replaced and the screws 17 installed.

The outer casing or main body portion 11 of the motor 10 includes a cylindrical member 24 held between opposite endbells 25 and 26. The inner edges of endbells 25 and 26 are provided with annular notches 27 and 28, respectively, as may be seen in FIGS. 3 and 5, the end notches 27 and 28 being shaped to receive opposite ends of the cylindrical member 24. A plurality of through bolts 30, one of which is shown in FIG. 5, passes through circular bores or openings 31 in the outer endbell 25 and are threaded at their opposite ends into openings (not shown) in the inner endbell 26. The threaded openings in inner endbell 26 may be blind bores or may pass entirely through the endbell 26. The outside surface of the outer endbell 25 may be provided with cavities or recesses 32 in the area of the opening 31 so that the head of 33 of the through bolt 30 does not protrude from the outer surface of the end bell 25. As the through bolts 30 are tightened, the cylindrical member 24 is tightly clamped between the endbells 25 and 26 to provide a rigid outer enclosure of the motor.

As is most apparent in FIG. 3, the shaft 12 extends through both endbells 25 and 26, and a fan member 34 is affixed to the inner end of shaft 12 which extends through the innerbell 26 so as to rotate with the shaft 12. The fan member 34 is enclosed within a fan shield 35 affixed to the inner endbell 26 by screws 36. The fan shield 35 thus provides a fan chamber 37 which encloses the fan 34 at one end of the motor.

The stator 40 (FIG. 3) includes a plurality of windings 41, normally of copper wire, which are held stationary within the cylindrical member 24 by a series of elongated metal plates 42 (FIGS. 4 and 6) which are positioned around the mid portions of the windings and engage the inner surface of the cylindrical member 24 along their outer edges. Because the plates are flat, they form a number of small voids 43 between their outer surfaces and the inner cylindrical surface of the cylindrical member 24. A cylindrical lamination is provided within the central portion of the windings 41 by a plurality of longitudinally extending lamination bars 44. The lamination bars 44 are slightly spaced but the space therebetween is closed by a plastic wedge member 45 (FIG. 6) so as to leave a plurality of grooves 46 between the lamination bars 44. The opposite ends 51 or turns of the windings 41 of the stator 40 are thus exposed beyond opposite ends of the plates 42 and the lamination bars 44. In conventionally manufactured motors, the stator windings are insulated by a covering formed by dipping the stator windings into a varnish.

The rotor 52 of the motor is cylindrical in form and is affixed to the shaft 12 for rotation therewith. The outer surface of the rotor consists of a plurality of slightly spaced, longitudinally extending lamination bars 53 in the assembled condition. The cylindrical array of lamination bars 53 of the rotor are disposed immediately within and slightly spaced from the lamination bars 44 of the stator so that the rotor may be driven by the magnetic forces produced by the energized stator windings and rotate therewithin.

It is to be appreciated that although reference is made in this application to the waterproofing of a conventional motor, this terminology is not intended to mean that the motor is sufficiently sealed that it may be submerged. Rather the waterproofing terminology is meant to indicate that the method of the present invention results in a motor in which there is considerable resistance of entry of liquids or moisture into the motor in a manner in which critical parts of the motor would be quickly damaged and therefore result in rapid deterioration of the motor. As may be noted from the above description, the motor is of a type which may be considered to be totally enclosed, but as previously described, without the motor being waterproofed in accordance with the present invention, there remains a number of passages through which liquid may gain entry to the interior parts of the motor.

The present method may be applied either to a new motor or one which has experienced previous use. Initially, the motor is completely dismantled, and if a motor is not new, it is inspected for internal wear and other defects. If it is necessary, for example, to rewind the stator, this operation is carried out and the stator may then have the conventional varnish applied thereto, preferably in a double dipping process.

The windings of the stator are then encapsulated with an epoxy of a type which is rubbery or pliable after curing. This type of epoxy, which is available under the trade mark Dolphon CB-1128, sold by John C. Dolph Company of Monmouth Junction, N.J., is used because the encapsulated parts can be subjected to movement, which may be due to heat expansion during the operation of the motor. Because the coating is pliable, it will not experience cracking. The epoxy may be sprayed on to the exposed portions of the winding, including the spaces between the lamination. In the treatment of a new motor, the stator may be retained in its affixed position within the cylindrical member 24. The epoxy should be applied, however, to fully cover the end portions 51 as shown in FIG. 3 and to fill the grooves 46 between the lamination bars 44 (see FIG. 6). In FIGS. 3 and 6, the coating of the epoxy is shown by the reference character 55.

In the method of the present invention, the junction box is also sealed with the same type of epoxy used in encapsulating the windings. The operation of applying the epoxy to the junction box may be carried out completely separately from the operation for encapsulating the windings of the stator, but because the epoxy is mixed in batches and has a limited time for usage, it is preferable to proceed immediately to the sealing of the junction box with the epoxy after the windings have been sprayed. Certain preparation steps should be carried out, however, in advance of the epoxy being applied to the junction box. In order to prevent the epoxy from leaking from the junction box past the stator immediately within the opening 22 in the cylindrical member 24, a moldable plastic material, such as duct seal is pushed through the opening 22 around the leads 21 so as to in effect provide a dammed area immediately within the opening 22. A ground wire 57 is secured at an inner end directly to the frame of the motor, i.e. the cylindrical member 24. If the motor is not provided with a lug affixed directly to the cylindrical member 24, the attachment is made by drilling a hole in the cylindrical member 24 and inserting an attachment screw 60, around which the stripped inner end of the ground wire 57 is wound, into the drilled opening.

The cylindrical member 24 is then positioned so that the junction box 14 is open in an upright position. The electrical leads are then held upright and the epoxy solution is poured into the box so as to provide a complete layer of epoxy 61 in the bottom of the box which is the outer surface of the frame or cylindrical member 24. The epoxy is preferably poured into the box until it reaches a depth of at least 3/16th of an inch or more. The epoxy completely covers the screw 60 which affixes the ground wire to the cylindrical casing 24, and additionally, the epoxy runs through the opening 22 and fills the cavity provided by the damming effect of the duct seal 56. Thus, the casing of the motor is completely sealed in the area of the junction box.

Once the pouring operation has been completed, the stator is stored with the junction box in an upright position, and it is kept at a temperature of about 20° to 25° C. for about 24 hours. This allows the epoxy to cure to a solid, but pliable state. If desired, the curing time may be accelerated by raising the temperature to about 150° C. for approximately 3 hours.

Before the motor is reassembled, any excessive epoxy overspray may be cleaned, such as to remove excess epoxy from the laminations by utilizing a grit wheel.

In order to provide protection to the rotor, it may be sprayed with an insulator product which dries to a tough, flexible film, such as a product sold by John C. Dolph Company under the trade mark Synthite ER-41.

As is apparent from FIG. 3, the output shaft 12 is supported near opposite ends by bearings in endbells 25 and 26. The bearings utilized in most conventional motors are usually open or shielded bearings. Such bearings are not generally suitable for damp or wet locations in that they allow entry of moisture and water which causes bearing failure. During the above-described disassembling of the motor, such bearings are pulled from the output shaft 12. Moreover, the endbells on most conventional motors are simply machined externally of the seats for the bearings so that the shaft 12 protrudes through each endbell at either end of the motor. During the reassembling of the motor in accordance with the present invention, the bearings are replaced with bearing 64 which incorporates metal reinforced synthetic rubber seals 65 and 65 fixed to the outer ring and having a rubber lip which contacts the inner ring. These bearings which are known as LLU or LLB and provide a positive seal to the bearings at all times. The rubber seals are effective in preventing moisture and water from contaminating the ball bearings. Without such seals, contamination may cause the bearings to seize or collapse.

Before reassembling the motor, each endbell is turned so as to machine an enlarged shaft opening 68 externally of the bearing seat. The enlarged opening 68 has a predetermined tolerance to accept a press fit spring loaded oil seal 66. The seal 66, which is preferably of the "C" flange type is forced into the fitting by way of a press. This seal has a lip portion which is biased against the outer circumference of shaft 12 when the motor is reassembled.

In order to provide a passage for the escape of any water which does find its way into the housing, each bellend is provided with a drain passage or hole 67. The drain holes 67 are drilled in each endbell near its periphery and in a position to be located in the lowermost portion of the main body 11 of the motor. If the motor is to be mounted in a horizontal position, then the drain holes are drilled at a 6 o'clock position in each endbell. The holes are relatively small, such as ⅛ of an inch in diameter. As shown, the holes 67 are at an angle relative to the horizontal for the purpose of impeding the entry of water through the holes, but provide a downwardly sloped passage for flow of any liquid from within the motor casing.

When the endbells 26 and 27 are being installed, it is preferable to treat the seals 66, 66 with a grease to lubricate the seal surfaces. An acceptable grease for use in a motor which is to be used in a food processing environment is a grease sold under the trade mark Nevastane HT/AW-2 marketed by Pennwalt Inc. of Oakville, Ontario.

When the endbells are being replaced, a small amount of a settable silicone sealant, such as Silastic 732, sold under the trade mark of Dow Corning, is applied to each of the bolt openings 32 (FIG. 5) so that as the bolt is passed through the opening there is a seal 69 formed which prevents water from entering via the opening 31. When the endbell 25 has been secured to the stator and the bolts are turned into place, a second application of Silastic 732, as indicated at 70, is applied around each bolt head so as to completely cover the bolt head. If the threaded opening in the opposite end bell is not a threaded blind bore, then the same type of sealant is used in the threaded opening when the bolts are being installed.

In order to ensure complete sealing between the endbells 25 and 26 and the cylindrical member 24 at the annular notches 27, and any like joints in other types of motors, a coating of epoxy type anti-rust paint is applied, as indicated 71 in FIG. 5 to the entire outside of the motor. The layer of epoxy-type paint 71 also prevents, of course, rusting of the outside surfaces of the motor.

Although only one embodiment of the invention has been shown as an example above, various modifications, within the spirit of the invention as defined in the accompanying claims, will be apparent to those skilled in the art.

I claim:
1. A method of waterproofing a conventional electric motor of the type having an outer casing, stator windings mounted interiorly of said casing, a junction box mounted on an external surface of said casing, and lead wires internally connected to said stator windings and extending through an opening in said outer casing into said junction box, said method comprising the steps of:
   disassembling said motor so as to provide access to said stator windings,
   applying to all exposed areas of said stator windings a covering of a liquid epoxy of a type capable of curing to a pliable coating, applying a moldable plastic material through said opening and around said lead wires so as to form a barrier between said opening and the interior of said casing, forming a layer of said liquid epoxy in said junction box to completely cover said opening and surround said lead wires extending through said opening, and allowing said epoxy covering and layer to cure prior to reassembly of said motor.

2. A method of waterproofing a motor as defined in claim 1, wherein an interior surface of said junction box is the exterior surface of said motor casing, and further including the step of affixing a ground wire directly to said exterior surface prior to forming said layer of epoxy in said junction box.

3. A method as defined in claim 2, wherein said ground wire is affixed to the exterior surface of said casing by way of a screw threaded into a bore in said casing, and said motor is held in a position in which said outer surface of said casing is a bottom horizontal surface in said junction box, and said liquid epoxy is poured into said box to provide a layer sufficiently thick to completely cover said screw.

4. A method as defined in claim 1, wherein said motor is held in a position wherein said outer surface of said casing is a bottom horizontal surface in said junction box, and said liquid epoxy is poured into said box to form said layer.

5. A method as defined in claim 1, wherein said moldable plastic material is pressed through said opening in said casing to form a cavity around said lead wires immediately within said opening, the outer surface of said casing forming a bottom surface in said junction box, and wherein said liquid epoxy is poured in said junction box to form a layer on said exterior surface about said opening and to flow into said cavity to thereafter cure as an integral mass.

6. A method as defined in claim 1, wherein said stator windings are of the type having a plurality of lamination bars extending in a longitudinal direction of the motor and defining an interior cylindrical shaped rotor receiving volume, said lamination bars being arranged side-by-side but slightly circumferentially spaced, the method further including the step of providing a layer of said epoxy between each lamination bar.

7. A method of waterproofing a conventional electric motor as defined in claim 1, wherein said outer casing is in the form of an outer enclosure formed by a central cylindrical member clamped between a pair of endbells by a plurality of through bolts drawing said endbells toward each other, said stator windings being affixed within the cylindrical member and having longitudinally extending, side-by-side lamination bars defining a central cylindrical volume, said windings having exposed end turn portions beyond the lamination bars, said motor further includes an axially disposed shaft mounted in bearings in said endbells and having opposite ends projecting through bores in said endbells, and a cylindrical shaped rotor affixed to said shaft and located within said central cylindrical volume, said method further comprising the steps of:

removing said through bolts so as to be able to separate said endbells from opposite ends of said cylindrical member and withdraw said rotor from said stator windings during said dissembling, applying to the end turns of said stator windings said liquid epoxy by spraying, applying said liquid epoxy in spaces between said lamination bars of said stator windings, grinding any excess cured epoxy from said lamination bars, replacing said bearings with sealed type bearings having side seals affixed to the outer ring of the bearing and being in sliding contact with the inner ring thereof.

drilling small drain holes near outer peripheral edges of said endbells so as to communicate with a lowermost portion of the interior of said enclosure when said motor is in its finally installed position subsequent to reassembling, said holes being drilled to extend from the inside out at angle downwardly relative to the horizon when said motor is in the installed position, reassembly said motor, and applying a coating of epoxy paint to the entire outside surface of said assembled motor.

8. A method as defined in claim 7, wherein said motor has a junction box affixed to an exterior surface of said enclosure, lead wires extending for said stator windings through an opening in said enclosure and into junction box, and further including the steps of:

applying a moldable plastic material through said opening and around said wires to thereby provide a barrier between the opening and the interior of said enclosure, turning the motor to a position in which said opening is at the bottom of said junction box, and pouring said liquid epoxy into said box so as to form a layer over the exterior surface of said enclosure in said junction box and allowing the liquid to flow into said opening and surround said lead wires.

9. A method according to claim 8, wherein a ground wire is attached directly to said exterior surface of said enclosure within said box prior to pouring in said liquid epoxy layer whereby the connection to the ground wire to the enclosure is buried in said layer after curing.

10. A method as defined by claim 7, wherein said endbells have bearing seats for receiving said bearings, and further comprising the steps of:

turning an enlarged opening coaxial with said bearing seat of the endbell and axially outwardly disposed relative to the bearing seat, and installing a press-fitted seal in said enlarged opening, said seal being of a type to have a lip portion biased into sliding contact with said shaft on reassembly of said motor.

11. A method as defined in claim 7, and wherein said rotor is sprayed with a liquid capable of drying to a tough flexible film and allowed to dry before said motor is reassembled.

12. A method as defined in claim 7, wherein said through bolts are of a type having a headed end for engagement with one endbell and an threaded outer end for reception in a bore of the opposite endbell, the headed end passing through an opening in said one endbell with the head engaging an outer surface thereof, and further including the steps of:

inserting a settable silicone sealant in the opening in the endbell before passing the through bolt therethrough during reassembling of the outer enclosure, and after tightening the through bolts, applying another layer of said sealant over the externally exposed headed end of the bolts.

* * * * *